(12) United States Patent
Huang-Fu et al.

(10) Patent No.: US 12,010,549 B2
(45) Date of Patent: Jun. 11, 2024

(54) HANDLING OF 5GSM CONGESTION TIMERS

(71) Applicant: MEDIATEK INC., Hsin-Chu (TW)

(72) Inventors: Chien-Chun Huang-Fu, Hsin-Chu (TW); Bo-Hun Chen, Hsin-Chu (TW); Chi-Hsien Chen, Hsin-Chu (TW); Shang-Ru Mo, Hsin-Chu (TW)

(*) Notice: Subject to any disclaimer, the term of this patent is extended or adjusted under 35 U.S.C. 154(b) by 0 days.

(21) Appl. No.: 17/474,915

(22) Filed: Sep. 14, 2021

(65) Prior Publication Data
US 2022/0116818 A1    Apr. 14, 2022

Related U.S. Application Data

(60) Provisional application No. 63/089,067, filed on Oct. 8, 2020.

(51) Int. Cl.
*H04W 28/02* (2009.01)
*H04W 84/04* (2009.01)

(52) U.S. Cl.
CPC ...... *H04W 28/0289* (2013.01); *H04W 84/042* (2013.01)

(58) Field of Classification Search
CPC ............ H04W 28/0289; H04W 84/042
See application file for complete search history.

(56) References Cited

U.S. PATENT DOCUMENTS

| 2020/0015311 | A1* | 1/2020 | Kim | H04W 68/005 |
| 2021/0274570 | A1* | 9/2021 | Catovic | H04W 48/18 |
| 2022/0264683 | A1* | 8/2022 | Liu | H04W 48/16 |

OTHER PUBLICATIONS

Taiwan IPO, office action for the Taiwanese patent application 110137261 (no English translation is available) dated May 9, 2022 (17 pages).
3rd Generation Partnership Project; Technical Specification Group Core Network and Terminals; Non-Access-Stratum (NAS) protocol for 5G System (5GS); Stage 3; (Release 17), Table 9.11.4.21.1, Sections 1, 4.4.1, 5.1.2, 5.3.19, 6.2.7, 6.2.8, 6.2.12, 6.3.1.2.1, 6.3.2.3, 6.3.3.3, 6.4.2.4.2, 9.11.4.21, 10.3, dated Sep. 2020 (729 pages).

* cited by examiner

*Primary Examiner* — Khaled M Kassim
*Assistant Examiner* — Najeeb Ansari
(74) *Attorney, Agent, or Firm* — Helen Mao; Zheng Jin; Imperium Patent Works (57) ABSTRACT

In 5GS, Single-Network Slice Selection Assistance Information (S-NSSAI) based backoff (BO) timers (T3584/T3585) can be applied to either the registered PLMN or all the PLMNs based on a 5GSM congestion re-attempt indicator. For a specific PDU session, the corresponding BO timer applied to the registered PLMN and the BO timer applied to all PLMN can be both running concurrently. It is proposed for a UE to stop both the BO timer applied to all the PLMNs and the BO timer applied to the registered PLMN, if running, in all the following scenarios: 1) Receiving a PDU session release command without a BO timer, 2) Receiving a PDU session release command with 5GSM cause #39, 3) Receiving a PDU session modification command, 4) Receiving a 5GSM message with a 5GSM congestion control BO timer value, and 5) Receiving a PDU session authentication command.

11 Claims, 6 Drawing Sheets

HANDLING OF 5GSM CONGESTION TIMERS

CROSS REFERENCE TO RELATED APPLICATIONS

This application claims priority under 35 U.S.C. § 119 from U.S. Provisional Application No. 63/089,067 entitled "Handling of Stopping 5GSM Congestion Timers", filed on Oct. 8, 2020, the subject matter of which is incorporated herein by reference.

TECHNICAL FIELD

The disclosed embodiments relate generally to wireless communication, and, more particularly, to method of supporting handling of 5G session management (5GSM) congestion timers in next generation 5G mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an Evolved Universal Terrestrial Radio Access Network (E-UTRAN) includes a plurality of evolved Node-Bs (eNodeBs or eNBs) communicating with a plurality of mobile stations, referred to as User Equipments (UEs). The $3^{rd}$ Generation Partner Project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G New Radio (NR) systems.

In 5GS, Single-Network Slice Selection Assistance Information (S-NSSAI) based congestion control mechanism is introduced. The network may detect and start performing S-NSSAI based congestion control when one or more S-NSSAI congestion criteria are met. The network would provide an "5GSM congestion re-attempt indicator" indicating whether the corresponding back-off (BO) timer is applied to all PLMNs, or only the registered PLMN. However, the "5GSM congestion re-attempt indicator" is an optional information element (IE). It is not defined which running back-off timer(s) should be stopped when 1) Both the timer value and the "5GSM congestion re-attempt indicator" are provided, 2) Only the timer value is provided, 3) Neither the timer value nor the "5GSM congestion re-attempt indicator" is provided, and 4) Only the "5GSM congestion re-attempt indicator" is provided. Furthermore, it is not defined how UE should stop the running S-NSSAI based congestion timer when a network-requested PDU session procedure is received by the UE.

A solution is sought.

SUMMARY

In 5GS, Single-Network Slice Selection Assistance Information (S-NSSAI) based backoff (BO) timers (T3584/T3585) can be applied to either the registered PLMN or all the PLMNs based on a 5GSM congestion re-attempt indicator. For a specific PDU session, the corresponding BO timer applied to the registered PLMN and the BO timer applied to all PLMN can be both running concurrently. It is proposed for a UE to stop both the BO timer applied to all the PLMNs and the BO timer applied to the registered PLMN, if running, in all the following scenarios: 1) Receiving a PDU session release command without a BO timer, 2) Receiving a PDU session release command with 5GSM cause #39, 3) Receiving a PDU session modification command, 4) Receiving a 5GSM message with a 5GSM congestion control BO timer value, and 5) Receiving a PDU session authentication command.

In one embodiment, a UE receives a 5G session management (5GSM) message in a mobile communication network. The UE is registered to a public land mobile network (PLMN). The UE determines whether a backoff (BO) timer is running. The running BO timer is applied for all PLMN or applied for the registered PLMN. The UE stops the running BO timer in response to the 5GSM message, wherein the 5GSM message belongs to one of a PDU session release command without a backoff timer, a PDU session release command with a 5G session management (5GSM) cause #39, a PDU session modification command, a PDU session authentication command, and a 5GSM message with a 5GSM congestion control backoff timer value. The UE starts a new BO timer after the running BO timer is stopped, in accordance with the 5GSM message where a BO timer is provided by the network.

In another embodiment, a UE receives a first 5G session management (5GSM) message in a mobile communication network. The UE is registered to a first public land mobile network (PLMN). The UE starts a first BO timer based on a first BO timer value carried in the first 5GSM message. The first BO timer is applied for a first PLMN type. The UE receives a second 5GSM message by the UE and in response stops the first BO timer. The UE starts a new BO timer based on a second BO timer value carried in the second 5GSM message. The new BO timer is applied to a second PLMN type, and the first PLMN type and the second PLMN type are different.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
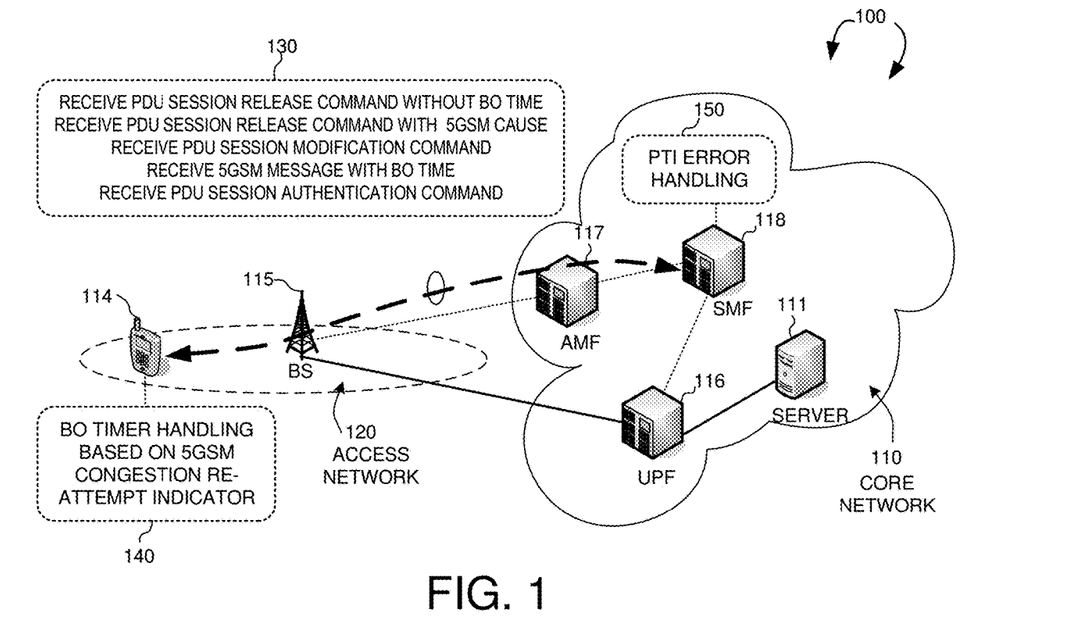
FIG. 1 illustrates an exemplary 5G New Radio (NR) network supporting handling of 5GSM congestion timers in accordance with one novel aspect.

FIG. 1 illustrates an exemplary 5G New Radio (NR) network 100 supporting handling of 5GSM congestion timers in accordance with one novel aspect. 5G/NR network 100 comprises application server 111 that provides various services by communicating with a plurality of User Equipments (UEs) including UE 114. In the example of FIG. 1, application server 111 belongs to a part of a Core Network (CN) 110. UE 114 and its serving base station BS 115 belong to part of a Radio Access Network (RAN) 120. RAN 120 provides radio access for UE 114 via a Radio Access Technology (RAT). Application server 111 communicates with UE 114 through User Plane Function (UPF) 116 and BS 115. An Access and Mobility Management Function (AMF) 117 communicates with BS 115, Session Management Function (SMF) 118, and UPF 116 for access and mobility management of wireless access devices in 5G/NR network 100. In the example of FIG. 1, AMF 117, SMF 118, and UPF 116 also belong to CN 110. UE 114 may be equipped with a Radio Frequency (RF) transceiver or multiple RF transceivers for different application services via different RATs/CNs. UE 114 may be a smart phone, a wearable device, an Internet of Things (IoT) device, and a tablet, etc.

In 5GS, Single-Network Slice Selection Assistance Information (S-NSSAI) based congestion control mechanism is introduced. At the UE side, 5GS session management timers T3584 for the S-NSSAI based congestion control are started and stopped on a per S-NSSAI, Data Network Name (DNN) and PLMN basis, and 5GS session management timers T3585 for the S-NSSAI based congestion control are started and stopped on a per S-NSSAI and PLMN basis. As depicted in 140, if an 5GSM congestion re-attempt indicator IE set to "The back-off timer is applied in all PLMNs" is included in the 5GSM message then the UE applies the timer T3584/T3585 for all the PLMNs. Otherwise, the UE applies the timer T3584/T3585 for the registered PLMN.

However, the "5GSM congestion re-attempt indicator" is an optional information element (IE). It is not defined which running back-off timer(s) should be stopped when 1) Both the timer value and the "5GSM congestion re-attempt indicator" are provided, 2) Only the timer value is provided, 3) Neither the timer value nor the "5GSM congestion re-attempt indicator" is provided, and 4) Only the "5GSM congestion re-attempt indicator" is provided. Furthermore, it is not defined how UE should stop the running S-NSSAI based congestion timer when a network-requested PDU session procedure is received by the UE. In accordance with one novel aspect, it is proposed for UE to stop both the BO timer applied to all the PLMNs if running, and the BO timer applied to the registered PLMN if running, in all the following scenarios (as depicted by 130): 1) Receiving a PDU session release command without a BO timer, 2) Receiving a PDU session release command with 5GSM cause #39, 3) Receiving a PDU session modification command, 4) Receiving a 5GSM message with a 5GSM congestion control BO timer value, and 5) Receiving a PDU session authentication command from the network.

Figure 2:
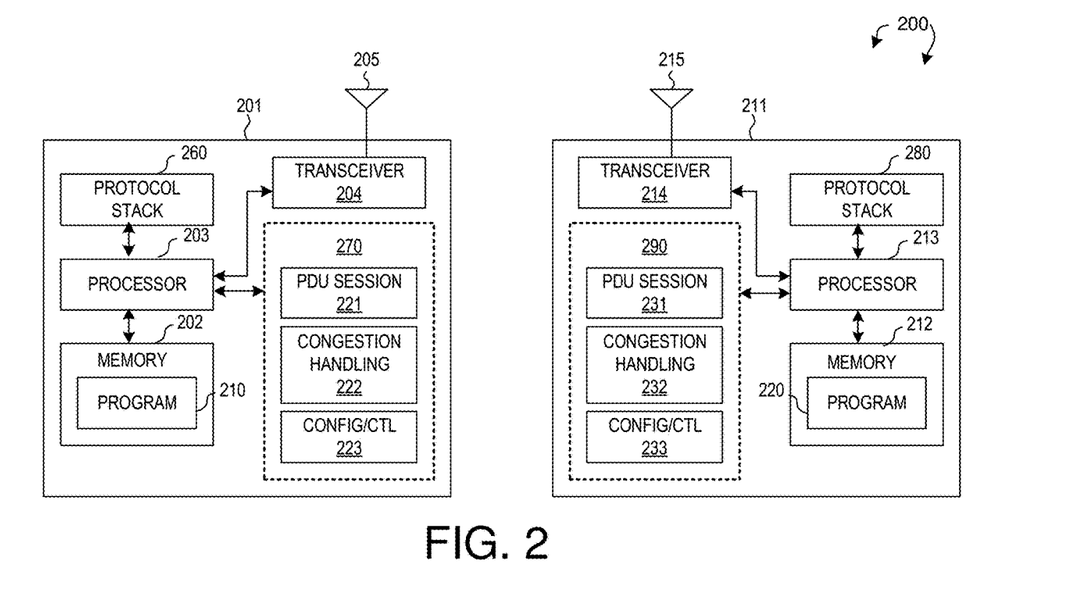
FIG. 2 illustrates simplified block diagrams of wireless devices in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an AMF. Network entity 211 has an antenna 215, which transmits and receives radio signals. An RF transceiver 214, coupled with the antenna 215, receives RF signals from antenna 215, converts them to baseband signals and transmits them to processor 213. RF transceiver 214 also converts received baseband signals from processor 213, converts them to RF signals, and transmits out to antenna 215. Processor 213 processes the received baseband signals and invokes different functional modules to perform features in network entity 211. Memory 212 stores program instructions and data 220 to control the operations of network entity 211. In the example of FIG. 2, network entity 211 also includes a set of control functional modules and circuit 290. PDU session handling circuit 231 handles PDU session establishment, modification, release, and authentication and authorization procedures. Congestion control handling circuit 232 handles backoff timer for congestion control. Configuration-and-control circuit 233 provides different parameters to configure and control UE 201.

Similarly, UE 201 has memory 202, a processor 203, and RF transceiver 204. RF transceiver 204 is coupled with antenna 205, receives RF signals from antenna 205, converts them to baseband signals, and transmits them to processor 203. RF transceiver 204 also converts received baseband signals from processor 203, converts them to RF signals, and transmits out to antenna 205. Processor 203 processes the received baseband signals and invokes different functional modules and circuits to perform features in UE 201. Memory 202 stores data and program instructions 210 to be executed by processor 203 to control the operations of UE 201. Suitable processors include, by way of example, a special purpose processor, a Digital Signal Processor (DSP), a plurality of micro-processors, one or more micro-processor associated with a DSP core, a controller, a microcontroller, Application Specific Integrated Circuits (ASICs), File Programmable Gate Array (FPGA) circuits, and other type of Integrated Circuits (ICs). A processor in associated with software may be used to implement and configure features of UE 201.

UE 201 also includes a set of functional modules and control circuits to carry out functional tasks of UE 201. Protocol stacks 260 includes Non-Access-Stratum (NAS) layer to communicate with an AMF and/or an SMF in the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by processor 203 via program instructions contained in memory 202, interwork with each other to allow UE 201 to perform embodiments and functional tasks and features in the mobile communication network. In one example, PDU session handling circuit 221 handles PDU session establishment, modification, release, and authentication and authorization procedures. Congestion control handling circuit 222 handles backoff timers for congestion control. Configuration-and-control circuit 223 handles configuration and control of UE 201.

Figure 3:
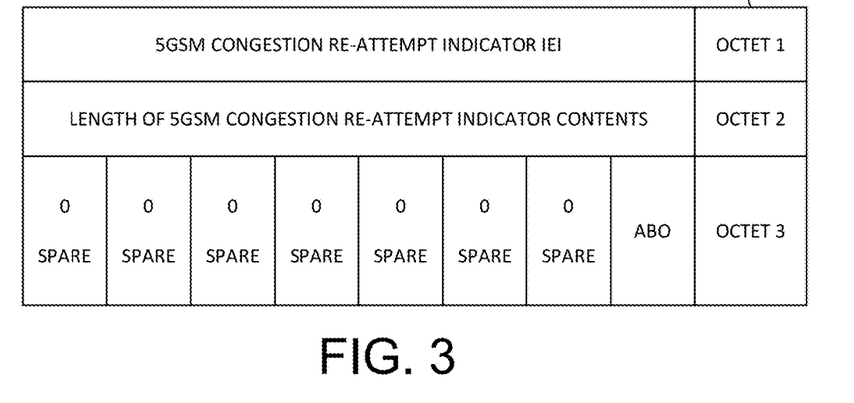
FIG. 3 illustrates a 5GSM congestion re-attempt indicator information element IE.

FIG. 3 illustrates a 5GSM congestion re-attempt indicator information element IE 300. In 5GS, S-NSSAI based congestion control mechanism is introduced. At the UE side, 5GS session management timers T3584 for the S-NSSAI based congestion control are started and stopped on a per S-NSSAI, DNN and PLMN basis, and 5GS session management timers T3585 for the S-NSSAI based congestion control are started and stopped on a per S-NSSAI and PLMN basis. The purpose of the Re-attempt indicator information element is to indicate a condition under which the UE is allowed in the current PLMN or its equivalent PLMN(s) for the same DNN, to re-attempt a session management procedure corresponding to the 5GS session management procedure which was rejected by the network. The purpose of the 5GSM congestion re-attempt indicator information element is to indicate whether the back-off timer is applied in the registered PLMN or all PLMNs. Specifically, the network would provide an "5GSM congestion re-attempt indicator", e.g., the ABO bit, to indicate whether the corresponding back-off (BO) timer is applied to all PLMNs, or the registered PLMN. However, the "5GSM congestion re-attempt indicator" is an optional IE. The network may or may not provide the BO timer value(s) and/or the corresponding 5GSM congestion re-attempt indicator.

In the UE, 5GS session management timers T3584 for the S-NSSAI based congestion control are started and stopped on a per S-NSSAI, DNN and PLMN basis. If the 5GSM congestion re-attempt indicator IE set to "The back-off timer is applied in all PLMNs" is included in the 5GSM message with the 5GSM cause value #67 "insufficient resources for specific slice and DNN", then the UE applies the timer T3584 for all the PLMNs. Otherwise, the UE applies the timer T3584 for the registered PLMN. If the timer T3584 applies for all the PLMNs, the timer T3584 starts when the UE is registered in a VPLMN and the S-NSSAI is provided by the UE during the PDU session establishment, the timer T3584 is associated with the [mapped S-NSSAI, DNN] combination of the PDU session.

In the UE, 5GS session management timers T3585 for the S-NSSAI based congestion control are started and stopped on a per S-NSSAI and PLMN basis. If the 5GSM congestion re-attempt indicator IE set to "The back-off timer is applied in all PLMNs" is included in the 5GSM message with the 5GSM cause value #69 "insufficient resources for specific slice", then the UE applies the timer T3585 for all the PLMNs. Otherwise, the UE applies the timer T3585 for the registered PLMN. If the timer T3585 applies for all the PLMNs, the timer T3585 starts when the UE is registered in a VPLMN and the S-NSSAI is provided by the UE during the PDU session establishment, the timer T3585 is associated with the mapped S-NSSAI of the PDU session.

Figure 4:
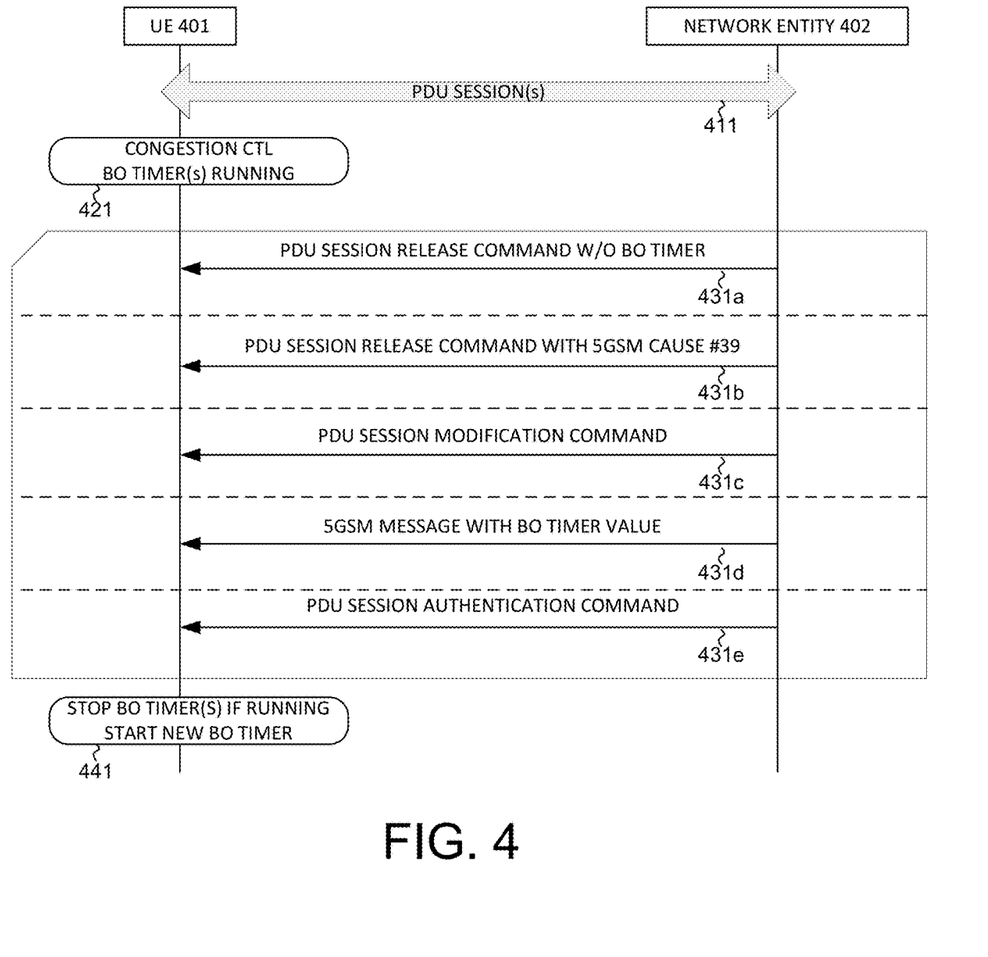
FIG. 4 illustrates a method of handling backoff timer under S-NSSAI based congestion control upon receiving a 5GSM message from the network.

FIG. 4 illustrates a method of handling backoff timer under S-NSSAI based congestion control upon receiving a 5GSM message from the network, with or without BO timer value and/or 5GSM congestion re-attempt indicator. In 5G/NR, a Protocol Data Unit (PDU) session defines the association between the UE and the data network that provides a PDU connectivity service. Each PDU session has information including SSC mode, Serving NSSAI, DNN, PDU session type, access type, PDU address, and PDU session ID (PSI). In step 411, UE 401 establishes one or more PDU session(s) with the network. In step 421, under certain scenarios of congestion control, UE 401 starts timers T3585 or T3584 for the S-NSSAI based congestion control on a per S-NSSAI, PLMN (and DNN) basis. The network would provide an "5GSM congestion re-attempt indicator" indicating whether the corresponding BO timer is applied to all PLMNs, or to the registered PLMN.

In step 431, UE 401 receives a 5GSM message from the network, which triggers the handling of congestion control and BO timer control. UE 401 may receive one of the following 5GSM messages: 1) Receiving a PDU session release command without a BO timer (431a), 2) Receiving a PDU session release command with 5GSM cause #39 (431b), 3) Receiving a PDU session modification command (431c), 4) Receiving a 5GSM message with a 5GSM congestion control BO timer value (431d), and 5) Receiving a PDU session authentication command (431e). This 5GSM message triggers the handling of existing BO timer(s), and the starting of a new BO timer. Note that for a specific PDU session, the corresponding BO timer applied to the registered PLMN and the BO timer applied to all PLMNs can be both running concurrently (e.g., in step 421). In one novel aspect, in step 441, UE 401 stops both the BO timer applied to all PLMNs and the BO timer applied to the registered PLMN, if running, in all the above scenarios, before the starting of the new BO timer.

This 5GSM message may not include the BO timer value, and may not include the "5GSM congestion re-attempt indicator". In a first example, when both the timer value and the "5GSM congestion re-attempt indicator" are provided in the 5GSM message, before the UE start the new BO timer, it stops the existing running timer, if any, including both the BO timer applied to all PLMNs and the BO timer applied to the registered PLMN. In a second example, when only the timer value (but no "5GSM congestion re-attempt indicator") is provided in the 5GSM message, before the UE start the new BO timer, it stops the existing running timer, if any, including both the BO timer applied to all PLMNs and the BO timer applied to the registered PLMN. In a third example, when neither the timer value nor the "5GSM congestion re-attempt indicator" is provided in the 5GSM message (e.g., PDU session release command), the UE stops the existing running timer, if any, including both the BO timer applied to all PLMNs and the BO timer applied to the registered PLMN. In a fourth example, when only the 5GSM congestion re-attempt indicator (but no "timer value") is provided in the 5GSM message, before the UE start the new BO timer, it stops the existing running timer, if any, including both the BO timer applied to all PLMNs and the BO timer applied to the registered PLMN.

Figure 5:
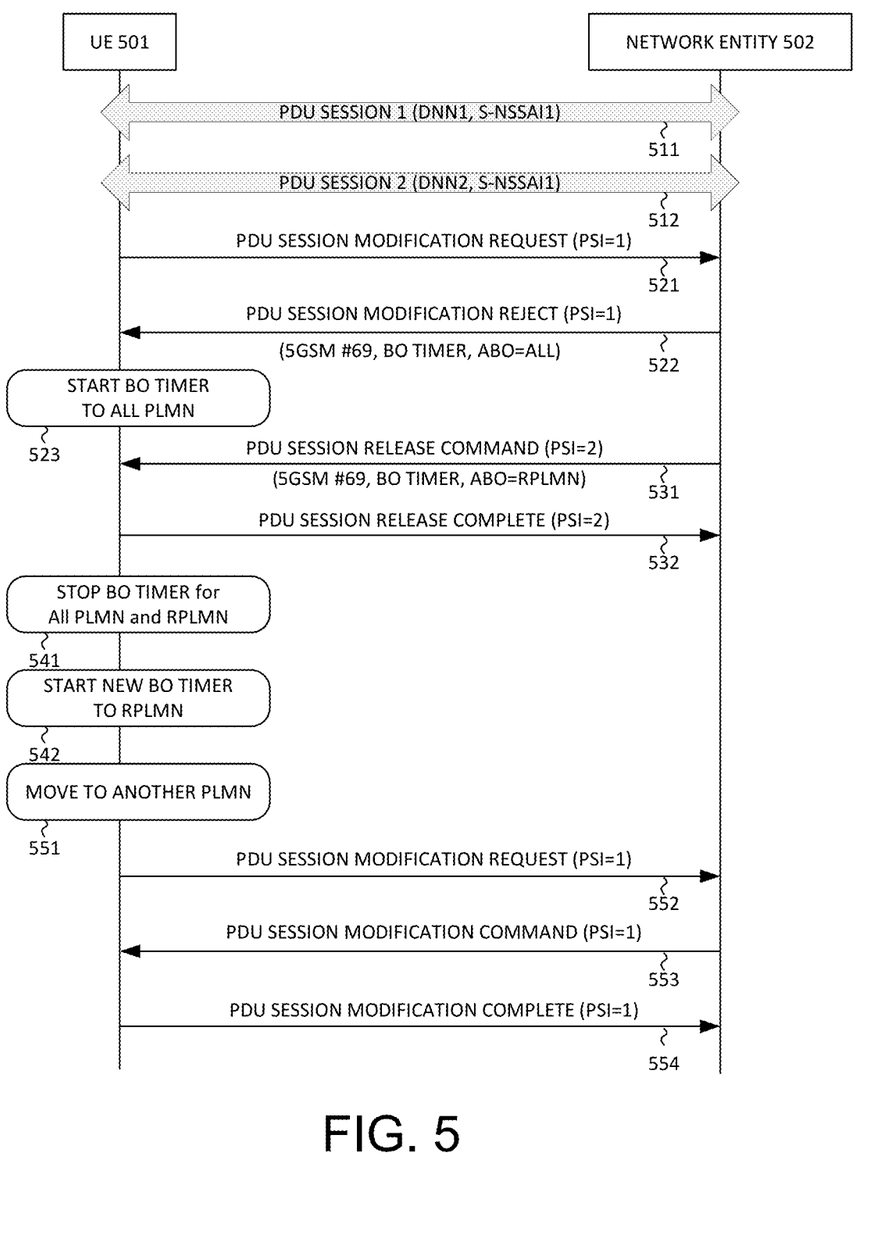
FIG. 5 illustrates a first embodiment of stopping existing BO timer(s) based on later received 5GSM message in accordance with one novel aspect.

FIG. 5 illustrates a first embodiment of stopping existing BO timer(s) based on a later received 5GSM message in accordance with one novel aspect. In step 511, UE 501 establishes a first PDU session1 with the network having parameters PSI=1, DNN1, and in S-NSSAI1. In step 512, UE 501 establishes a second PDU session2 with the network having parameters PSI=2, DNN2, and in the same S-NSSAI1. In step 521, UE 501 sends a PDU session modification request message to add a new QoS flow for PDU session1. In step 522, the network rejects the request and sends a PDU session modification reject message to UE 501, due to slice congestion. The reject message carries a 5GSM cause #69, a BO timer value, and ABO=ALL PLMN. In response to the reject message, in step 523, UE 501 starts a BO timer (e.g., T3585) associated with S-NSSAI1 applied to all PLMNs. In step 531, the network releases the PDU session2 by sending a PDU session release command. The release message carries a 5GSM cause #69, a BO timer value, and ABO=RPLMN. In step 532, UE 501 sends a PDU session release complete message to the network. In addition, in response to the PDU session release command, UE 501 needs to start another new BO timer (e.g., T3585) associated with S-NSSAI1 applied to RPLMN.

The PDU session release command is a second 5GSM message for PDU session2 in the same S-NSSAI1, which triggers S-NSSAI based congestion control and BO timer handling. Before starting the new BO timer, in step 541, UE 501 stops the running BO timer applied to all PLMNs. In step 542, UE 501 starts a new BO timer, e.g., according to the BO timer value and applied to RPLMN based on the 5GSM message received in step 531. In step 551, UE 501 moves to another new PLMN. Since the new BO timer is applied to RPLMN only, it is not applicable to the new PLMN. Therefore, in step 552, UE 501 is allowed to resend the PDU session modification request message (to add a new QoS flow for PDU session1, as in step 521) to the network. In step 553, UE 501 receives a PDU session modification command message from the network. In step 554, UE 501 sends a PDU session modification complete message to the network.

Note that before UE 501 receives the 5GSM message in step 531, UE 501 already has an existing BO timer running associated with S-NSSAI1, the running BO timer is applied for ALL PLMN. Upon receiving the 5GSM message in step 531, UE 501 stops the running BO timer, regardless of whether the 5GSM message carries a new BO timer value, and regardless of the "5GSM congestion re-attempt indicator". For example, when the running BO timer is for ALL PLMN, and the new BO timer is for RPLMN (different PLMN types), the running BO timer needs to be stopped before the new BO timer is started. Further, if two BO timers are running, and the two BO timers are applied to ALL PLMN and RPLMN, then both BO timers need to be stopped. In addition, note that although the method in FIG. 5 is for 5GSM cause #69 and BO timer T3585, same method can be applied for 5GSM cause #67 and BO timer T3584.

Figure 6:
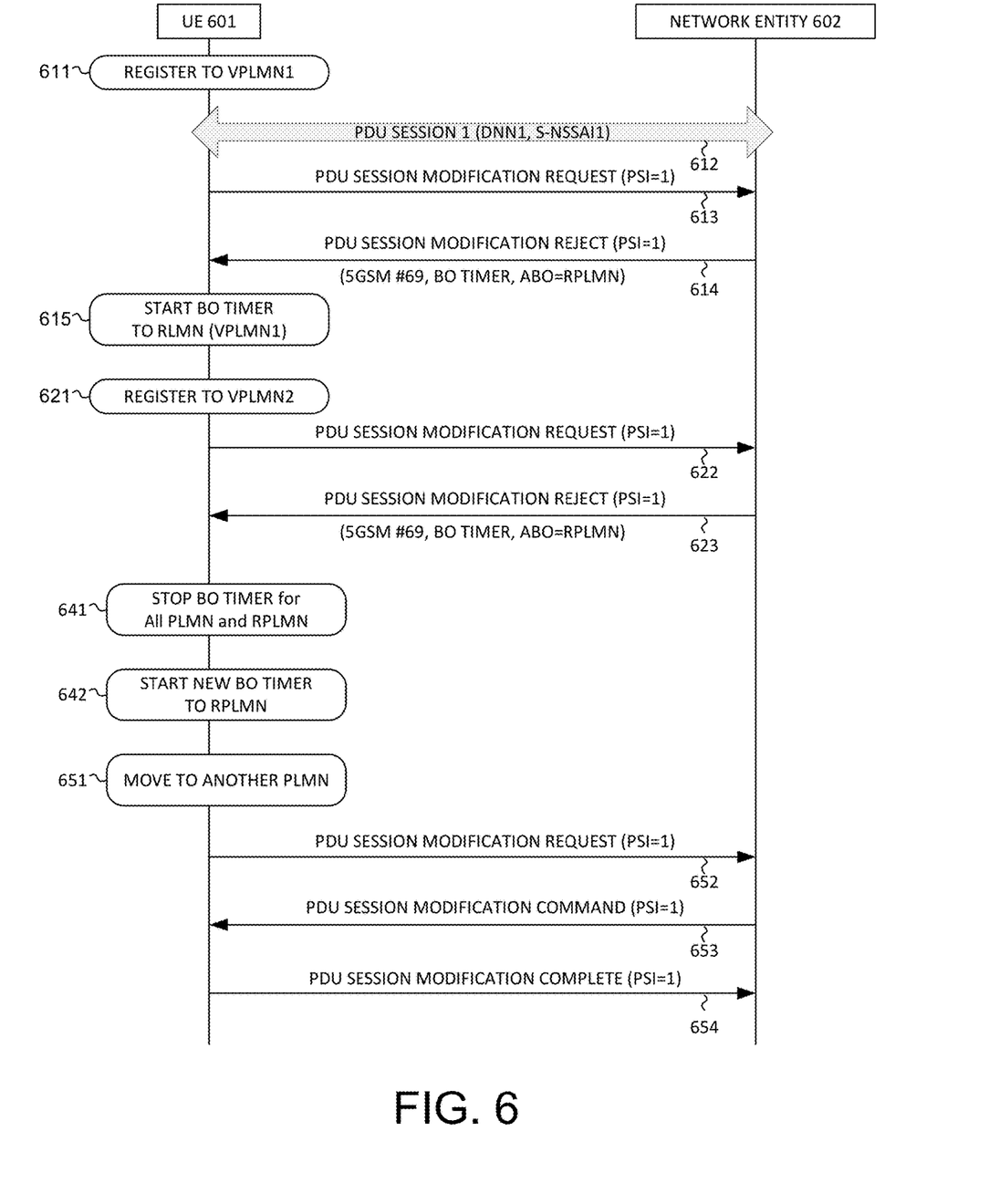
FIG. 6 illustrates a second embodiment of stopping existing BO timer(s) based on later received 5GSM message in accordance with one novel aspect.

FIG. 6 illustrates a second embodiment of stopping existing BO timer(s) based on later received 5GSM message in accordance with one novel aspect. In step 611, UE 601 registers to a first PLMN (VPLMN1). In step 612, UE 601 establishes a PDU session1 with the network having parameters PSI=1, DNN1, and in S-NSSAI1. In step 613, UE 601 sends a PDU session modification request message to add a new QoS flow for PDU session1. In step 614, the network rejects the request and sends a PDU session modification reject message to UE 601, due to slice congestion. The reject message carries a 5GSM cause #69, a BO timer value, and ABO=RPLMN. In response to the reject message, in step 615, UE 601 starts a BO timer (e.g., T3585) associated with S-NSSAI1 applied to RPLMN (VPLMN1). In step 621, UE 601 registers to another PLMN (VPLMN2). Because the BO timer is applied to VPLMN1 only, in step 622, UE 601 is allowed to send a second PDU session modification request message to add a new QoS flow for PDU session1. In step 623, the network rejects the request and sends a second PDU session modification reject message to UE 601, due to slice congestion. The second PDU session modification reject message carries a 5GSM cause #69, a BO timer value, and ABO=RPLMN. In response to the reject message, UE 601 needs to start a new BO timer (e.g., T3585) associated with S-NSSAI1 applied to RPLMN (VPLMN2).

The second PDU session modification reject message is for PDU session1 in the same S-NSSAI1, which triggers S-NSSAI based congestion control and BO timer handling. Before starting the new BO timer, In step 641, UE 601 stops the running BO timer applied to VPLMN1. In step 642, UE 601 starts a new BO timer, e.g., according to the BO timer value and applied to RPLMN (VPLMN2) based on the 5GSM message received in step 623. In step 651, UE 601 moves back to VPLMN1. Since the new BO timer is applied to VPLMN2 only, it is not applicable to VPLMN1. Therefore, in step 652, UE 601 is allowed to resend the PDU session modification request message (to add a new QoS flow for PDU session1, as in step 613) to the network. In step 653, UE 601 receives a PDU session modification command message from the network. In step 654, UE 601 sends a PDU session modification complete message to the network.

Note that before UE 601 receives the 5GSM message in step 623, UE 601 already has an existing BO timer running associated with S-NSSAI1, the running BO timer is applied for VPLMN1. Upon receiving the 5GSM message in step 623, UE 601 stops the running BO timer, regardless of whether the 5GSM message carries a new BO timer value, and regardless of the "5GSM congestion re-attempt indicator". For example, when the running BO timer is for VPLMN1, and the new BO timer is for VPLMN2 (different PLMN but same RPLMN type), the running BO timer needs to be stopped before the new BO timer is started. Further, if two BO timers are running, and the two BO timers are applied to ALL PLMN and RPLMN, then both BO timers need to be stopped. In addition, note that although the method in FIG. 6 is for 5GSM cause #69 and BO timer T3585, same method can be applied for 5GSM cause #67 and BO timer T3584.

Figure 7:
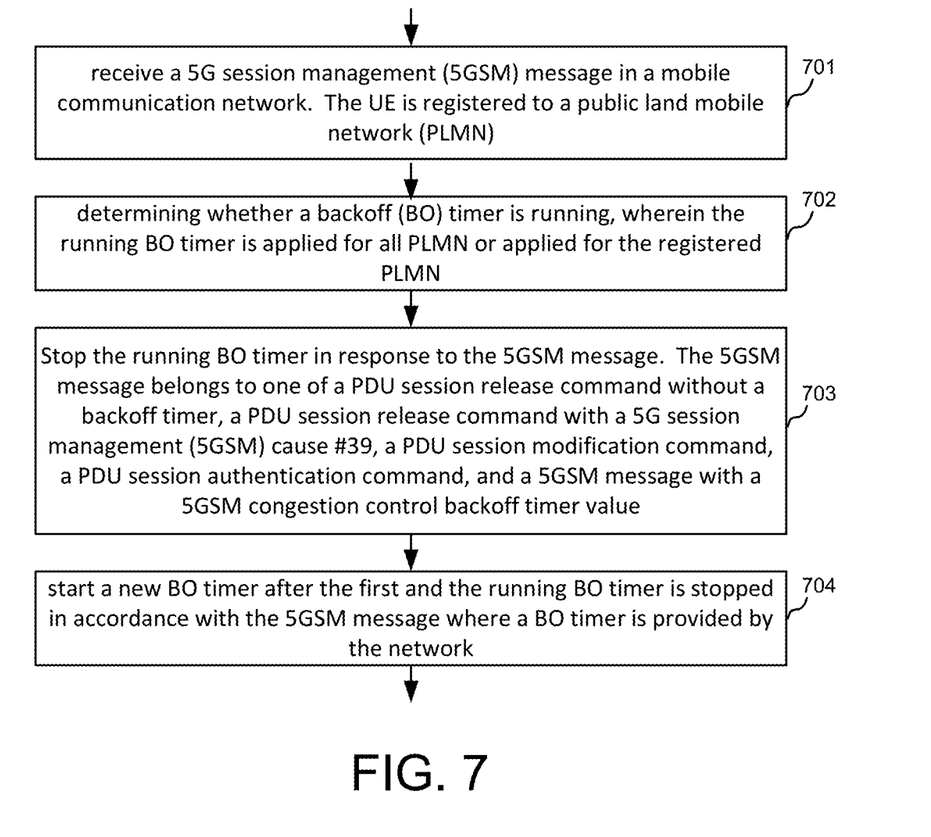
FIG. 7 is a flow chart of a method of handling backoff timer under S-NSSAI based congestion control upon receiving a 5GSM message in accordance with one novel aspect.

FIG. 7 is a flow chart of a method of handling backoff timer under S-NSSAI based congestion control upon receiving a 5GSM message in accordance with one novel aspect. In step 701, a UE receives a 5G session management (5GSM) message in a mobile communication network. The UE is registered to a public land mobile network (PLMN). In step 702, the UE determines whether a backoff (BO) timer is running, wherein the running BO timer is applied for all PLMN or applied for the registered PLMN. In step 703, the UE stops the running BO timer in response to the 5GSM message, wherein the 5GSM message belongs to one of a PDU session release command without a backoff timer, a PDU session release command with a 5G session management (5GSM) cause #39, a PDU session modification command, a PDU session authentication command, and a 5GSM message with a 5GSM congestion control backoff timer value. In step 704, the UE starts a new BO timer after the running BO timer is stopped, in accordance with the 5GSM message where a BO timer is provided by the network.

Figure 8:
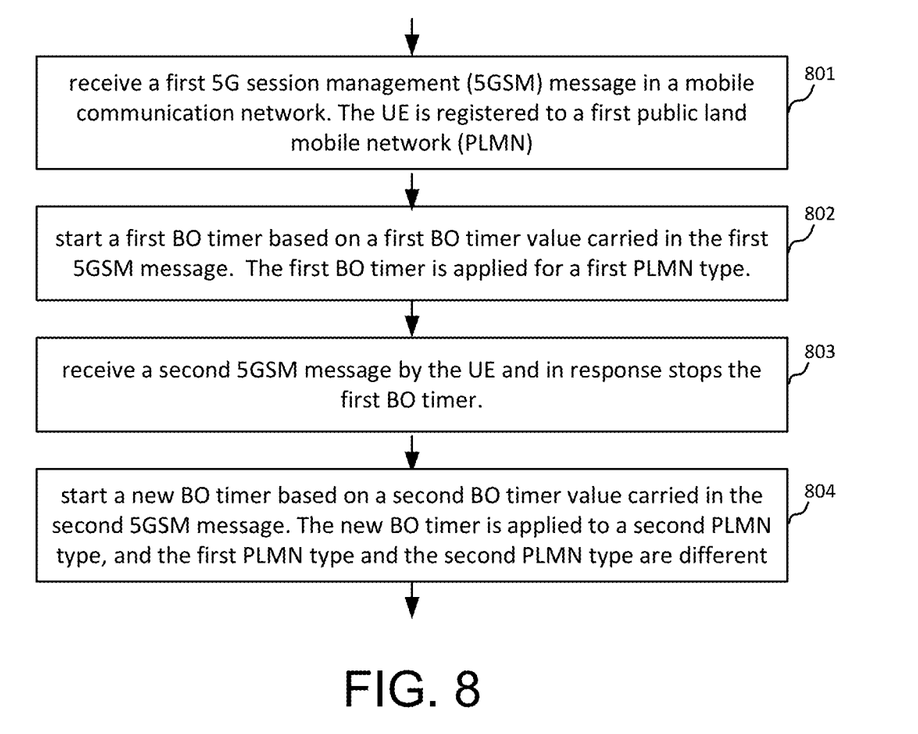
FIG. 8 is a flow chart of another method of handling backoff timer under S-NSSAI based congestion control upon receiving a 5GSM message in accordance with one novel aspect.

FIG. 8 is a flow chart of another method of handling backoff timer under S-NSSAI based congestion control with or without BO timer value and/or 5GSM congestion re-attempt indicator in accordance with one novel aspect. In step 801, a UE receives a first 5G session management (5GSM) message in a mobile communication network. The UE is registered to a first public land mobile network (PLMN). In step 802, the UE starts a first BO timer based on a first BO timer value carried in the first 5GSM message. The first BO timer is applied for a first PLMN type. In step 803, the UE receives a second 5GSM message by the UE and in response stops the first BO timer. In step 804, the UE starts a new BO timer based on a second BO timer value carried in the second 5GSM message. The new BO timer is applied to a second PLMN type, and the first PLMN type and the second PLMN type are different.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    receiving a 5G session management (5GSM) message by a user equipment (UE) in a mobile communication network, wherein the UE is registered to a public land mobile network (PLMN), wherein the 5GSM message comprises a 5GSM congestion re-attempt indicator, and wherein the 5GSM congestion re-attempt indicator indicates a new backoff (BO) timer applied to all PLMN or the registered PLMN;
    determining whether a BO timer is running, wherein the running BO timer is applied for all PLMN or applied for the registered PLMN;
    stopping the running BO timer in response to the 5GSM message; and
    starting one or more new BO timers after the running BO timer is stopped, in accordance with the 5GSM message where the one or more new BO timers are provided by the network, and wherein each of the one or more new BO timers and the running BO timer corresponds to a different PLMN type.

2. The method of claim 1, wherein the running BO timer and the new BO timer are associated with a Single-Network Slice Selection Assistance Information (S-NSSAI), or associated with the same S-NSSAI and data network name (DNN) combination.

3. The method of claim 1, wherein the UE stops the running BO timer when the 5GSM message does not comprise a 5GSM congestion re-attempt indicator.

4. A User Equipment (UE), comprising:
    a receiver that receives a 5G session management (5GSM) message in a mobile communication network, wherein the UE is registered to a public land mobile network (PLMN), wherein the 5GSM message comprises a 5GSM congestion re-attempt indicator, and wherein the 5GSM congestion re-attempt indicator indicates a new backoff (BO) timer applied to all PLMN or the registered PLMN;
    a congestion control circuit that determines whether a backoff (BO) timer is running, wherein the running BO timer is applied for all PLMN or applied for the registered PLMN, wherein
    the congestion control circuit stops the running BO timer in response to the 5GSM message; and
    one or more new BO timers that are started after the running BO timer is stopped, in accordance with the 5GSM message where the one or more new BO timer is are provided by the network, and wherein each of the one or more new BO timers and the running BO timer corresponds to a different PLMN type.

5. The UE of claim 4, wherein the running BO timer and the new BO timer are associated with a Single—Network Slice Selection Assistance Information (S-NSSAI), or associated with the same S-NSSAI and data network name (DNN) combination.

6. The UE of claim 4, wherein the UE stops the running BO timer when the 5GSM message does not comprise a 5GSM congestion re-attempt indicator.

7. A method, comprising:
    receiving a first 5G session management (5GSM) message by a user equipment (UE) in a mobile communication network, wherein the UE is registered to a first public land mobile network (PLMN), wherein the first 5GSM message comprises a 5GSM congestion re-attempt indicator, and wherein the 5GSM congestion re-attempt indicator indicates a new backoff (BO) timer applied to all PLMN or the registered PLMN;
    starting a first BO timer based on a first BO timer value carried in the first 5GSM message, wherein the first BO timer is applied for a first PLMN type;
    receiving a second 5GSM message by the UE and in response stops the first BO timer; and
    starting a new BO timer based on a second BO timer value carried in the second 5GSM message, wherein the new BO timer is applied to a second PLMN type, and wherein the first PLMN type and the second PLMN type are different, and wherein the second 5GSM messages carries a 5GSM congestion re-attempt indicator that indicates the second PLMN type.

8. The method of claim 7, wherein the second 5GSM message belongs to one of a PDU session release command, a PDU session modification reject, and a PDU session establishment reject.

9. The method of claim 7, wherein the second 5GSM message does not comprise a 5GSM congestion re-attempt indicator.

10. The method of claim 7, wherein the first PLMN type is ALL-PLMN and the second PLMN type is Registered-PLMN, or the first PLMN type is Registered-PLMN and the second PLMN type is ALL-PLMN.

11. The method of claim 7, wherein the UE is registered to a second PLMN when the UE receives the second 5GSM message.

* * * * *